May 16, 1961 R. E. STABNAU 2,984,061
LAWN MOWER CLEANING DEVICE
Filed May 7, 1958
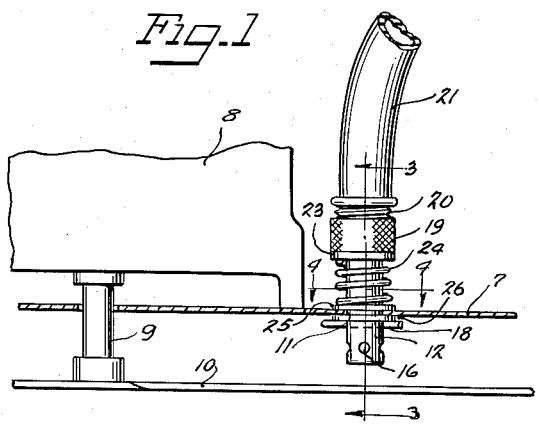
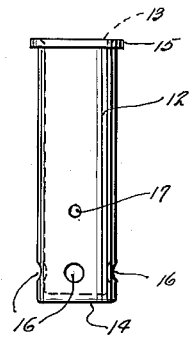
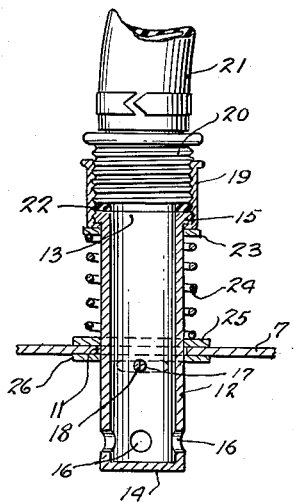
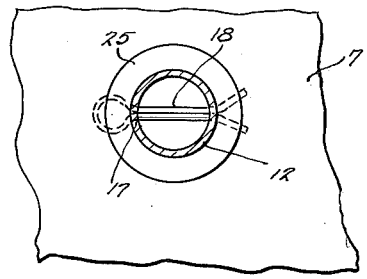
Inventor
ROY E STABNAU
By Edward M. Apple
Atty

United States Patent Office 2,984,061
Patented May 16, 1961

2,984,061
LAWN MOWER CLEANING DEVICE
Roy E. Stabnau, 12054 Belleville Road, Belleville, Mich.
Filed May 7, 1958, Ser. No. 733,692
1 Claim. (Cl. 56—25.4)

This invention relates to cleaning devices for rotary type lawn mowers and the object of the invention is to generally improve such devices.

Another object of the invention is to provide a device of the character indicated, which is simple in construction, economical to manufacture and readily installed, on either a new or a used lawn mower.

Another object of the invention is to provide a device of the character indicated, which is constructed and arranged in such a manner that it may be installed on the housing of any type of lawn mower, regardless of the thickness of the metal comprising the walls of the lawn mower housing.

Another object of the invention is to provide a device of the character indicated, which is constructed with resilient means, for preventing the device from rattling, or becoming displaced from the lawn mower by vibration, when the lawn mower is being used in its regular capacity.

The foregoing and other objects and advantages of the invention will become more apparent as the description proceeds, reference being made from time to time to the accompanying drawing forming a part of the within disclosure, in which drawing:

Fig. 1 is a fragmentary view, with parts in section, of a rotary lawn mower to which is attached the device embodying the invention.

Fig. 2 is an enlarged detail of one of the principal parts of the device shown in Fig. 1.

Fig. 3 is a vertical section, taken substantially on the line 3—3 of Fig. 1.

Fig. 4 is a section taken substantially on the line 4—4 of Fig. 1.

Referring now more particularly to the drawing, it will be understood that in the embodiment herein disclosed, the reference character 7 indicates the housing of a rotary type lawn mower, which is provided with a gasoline engine 8, having a shaft 9, to which is secured for rotation therewith, a conventional cutting blade 10.

In order to enable me to clean the cut grass, leaves, dirt and other debris from the cutting blade 10, and the inside of the lawn mower housing 7, I attach to the housing 7 the structure which I will now describe. A suitable opening 11, is formed in the housing 7, in a position above the plane of rotation of the cutting blade 10, so that water discharged from the device, may be finely dispersed, and broken up into a fine mist, by the cutting blade 10, as the latter is being rotated, during the admission of water to the lawn mower housing.

One of the principal parts of the device embodying the invention, consists of a tubular member 12, open at the top (Figs. 1 and 2) as at 13, and closed at the bottom, as at 14. Element 12 may either be a casting of a deep drawn stamping. The element 12 is provided with an outwardly directed flange 15, and a plurality of transverse openings 16, through which water may be discharged. The member 12 is also provided with apertures 17, through which may be extended a cotter pin 18 (Fig. 1). The member 12 extends through a female hose fitting 19 (Fig. 3), which hose fitting 19 is adapted to receive the external threads of the male hose fitting 20, which is secured to the end of a conventional garden hose 21. A suitable gasket 22 (Fig. 3) is interposed between the hose fitting 20 and the flange 15 of the member 12.

The member 12 is secured to the housing 7 in the following manner: The member 12 is first inserted through the opening in the female hose fitting 19, and is then provided with a washer 23, the compression spring 24, and a second washer 25 at the lower end of the spring 14. The free end of the member 12 is then inserted through the opening 11 formed in the housing 7, after which another washer 26 is positioned on the member 12 beneath the housing 7. The cotter pin 18 is then inserted through the apertures 17 and bent to prevent its becoming displaced. This means of attachment gives the assembly considerable resiliency, and limits the vibrations of the device, when the lawn mower is being used to cut grass.

The device embodying the invention of course is only used when the lawn mower is not being used for grass cutting purposes. During the grass cutting operation the garden hose 12 and the male fitting 20 are removed from the lawn mower, but the other parts just described, remain on the lawn mower until it is desired to attach the garden hose thereto, and wash from the lawn mower any debris which has been previously collected on the cutting blade and the inside of the housing, during the grass cutting operation.

It is believed that the operation of the device is obvious from the foregoing description.

Having described my invention what I claim and desire to secure by Letters Patent is:

A cleaning device for a rotary lawn mower, having a cowling and a cutting blade rotatable therein, comprising a nozzle for attachment to a conventional garden hose, said nozzle consisting of a deep well-like element, which extends through an opening in said cowling, said well-like element having a plurality of radial holes therein, there being a shoulder on said nozzle, exterior of said cowling for receiving a spring which is normally positioned between said shoulder and said cowling, and means for limiting the action of said spring.

References Cited in the file of this patent
UNITED STATES PATENTS

| | | |
|---|---|---|
| 1,752,823 | Walker | Apr. 1, 1930 |
| 2,155,220 | Ehret | Apr. 18, 1939 |
| 2,519,738 | Butler | Aug. 22, 1950 |
| 2,566,324 | Frese | Sept. 4, 1951 |
| 2,742,751 | Laughlin | Apr. 24, 1956 |
| 2,796,714 | Denney | June 25, 1957 |
| 2,908,444 | Mullin | Oct. 13, 1959 |
| 2,936,563 | Blume | May 17, 1960 |